(12) United States Patent
Eriksson (10) Patent No.: US 8,223,758 B2
(45) Date of Patent: Jul. 17, 2012

(54) SYSTEM AND METHOD OF LOAD DEPENDENT RATE POLICING

(75) Inventor: Ann-Christine Eriksson, Grillby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 163 days.

(21) Appl. No.: 12/513,816

(22) PCT Filed: Nov. 7, 2007

(86) PCT No.: PCT/EP2007/062017
§ 371 (c)(1),
(2), (4) Date: Jul. 22, 2009

(87) PCT Pub. No.: WO2008/055936
PCT Pub. Date: May 15, 2008

(65) Prior Publication Data
US 2009/0310487 A1    Dec. 17, 2009

Related U.S. Application Data

(60) Provisional application No. 60/864,679, filed on Nov. 7, 2006.

(51) Int. Cl.
*H04L 12/50* (2006.01)

(52) U.S. Cl. .......... 370/358; 370/235; 370/253
(58) Field of Classification Search .......... 370/252–253, 370/358–388, 391, 395.61–395.65, 447–449, 370/506
See application file for complete search history.

(56) References Cited

U.S. PATENT DOCUMENTS

| | | | |
|---|---|---|---|
| 2005/0018690 A1* | 1/2005 | Kilkki | 370/395.6 |
| 2007/0147244 A1* | 6/2007 | Rasanen | 370/231 |
| 2008/0043625 A1* | 2/2008 | Cohen et al. | 370/236 |
| 2009/0252049 A1* | 10/2009 | Ludwig et al. | 370/252 |

* cited by examiner

*Primary Examiner* — Pao Sinkantarakorn
*Assistant Examiner* — Iqbal Zaidi (57) ABSTRACT

A system, method and node for rate policing of bearers in a network. The method includes the steps of associating individual bearers from a first plurality of bearers with a first bit rate limit and a maximum bit rate, MBR, setting a load level for the first plurality of bearers in the communication network, determining an actual load in the communication network, wherein the actual load depends on the first plurality of bearers, and determining if the actual load is below the set load level. If the actual load is below the set load level the individual bearers from said first plurality of bearers are policed based on the associated MBR for the individual bearers. Else policing of the individual bearers is based on the first limit for the bit rate associated with the individual bearers.

24 Claims, 5 Drawing Sheets

SYSTEM AND METHOD OF LOAD DEPENDENT RATE POLICING

CROSS-REFERENCE TO RELATED APPLICATIONS

This application claims the benefit of U.S. Provisional Application No. 60/864,679, filed Nov. 7, 2006, the disclosure of which is fully incorporated herein by reference.

TECHNICAL FIELD

The present invention relates to rate policing in a telecommunications network. More particularly, and not by way of limitation, the present invention is directed to a system and method for policing rates upon bearers which is dependent upon the load of the network.

BACKGROUND

Today's mobile communication systems, such as Universal Mobile Telecommunication System (UMTS) and Global System for Mobile Communications (GSM) networks, are capable of supporting a wide variety of applications having different demands on needed transmission capability. The applications range from a simple transfer of a text message, which does not require high capacity and is not time critical, to video conferencing, which is a real time application requiring high transmission capacity. The concept of Quality of Service (QoS) was introduced to ensure that an end user, running an application, receives the system resources required for that particular application. Simultaneously, by not using more resources than necessary for the application, the use of QoS contributes to the optimization of the system resources.

In UMTS and GSM networks, bearers are defined by a QoS profile with a number of QoS attributes. Two of these QoS attributes for defining the bit rates used by the bearers, are Maximum Bit rate (MBR) and Guaranteed Bit Rate (GBR). For a bearer, both attributes, MBR and GBR may be present. Alternatively, only the MBR attribute may be present. If the GBR attribute is present, the bearer is designated as a GBR-bearer. If the GBR attribute is not present, the bearer is designated as a non-GBR bearer.

The MBR attribute is defined as the maximum number of bits delivered for that bearer at a Service Access Point (SAP) within a period of time divided by the duration of the period. The traffic conforms to the MBR as long as it follows a token bucket algorithm where the token rate equals MBR and the bucket size equals the maximum Service Data Unit (SDU) size. An example of such a token bucket algorithm is specified in 3GPP TS 23.107. The MBR is the upper limit a user or application can accept or provide. UMTS or GSM bearer service attributes may be fulfilled for traffic up to the MBR depending on the network conditions.

The GBR attribute defines the bit rate that is guaranteed or targeted within the network. The GBR is defined as the guaranteed number of bits delivered at a SAP within a period of time (provided that there is data to be delivered) divided by the duration of the period. The traffic conforms to the GBR as long as it follows a token bucket algorithm where the token rate equals GBR and the bucket size equals the maximum SDU size. The bearer QoS attributes, such as delay and reliability attributes, are guaranteed for traffic up to the GBR. For traffic exceeding the GBR, the bearer QoS attributes are not guaranteed.

The MBR attribute may be utilized to limit the delivered bit rate to applications or external networks with such limitations. In addition, the MBR attribute may be utilized to allow a maximum wanted bearer bit rate to be defined for applications able to operate with different rates, such as applications with adapting coder-decoders (codecs) utilized for example, for speech encoding.

The GBR attribute may be utilized to facilitate admission control based upon available resources and for reserving resources when setting up new bearers in the network. The GBR attribute may also be utilized for policing the bit rate for bearers in the network according to the GBR.

Existing policing schemes utilize the MBR for non-GBR bearers and the GBR for GBR bearers. The rate policing is conducted on the MBR for non-GBR bearers and rate policing is conducted upon the GBR for GBR bearers. However, existing policing schemes suffer from several disadvantages. At low loads on the network, the resources are not fully utilized for GBR bearers since the GBR bearers are not allowed to exceed their GBR for longer time periods (e.g., as defined by a token bucket algorithm) even though there is data to be sent for the bearer and available resources.

SUMMARY

It is correspondingly an object to propose a system, device and method for policing rates on bearers depending upon the load on the network. The present invention provides such a system and method.

The present invention is a system, method and node for rate policing of bearers in a network. In one aspect, the present invention is directed to a method which includes the steps of associating individual bearers from a first plurality of bearers with a first limit for the bit rate and a maximum bit rate, MBR. A load level is set for the first plurality of bearers in the communication network. The actual load in the communication network is determined, the actual load depending on the first plurality of bearers.

The actual load level of the plurality of bearers is determined and if the actual load level is below the set load level, individual bearers in the first plurality of bearers are policed based on the associated MBR for each bearer. If the actual load is not below the set load level, the individual bearers are policed based on the first limit for the bit rate that is associated with the individual bearers.

In another aspect, the present invention is directed to a system for rate policing of a bearer in a communication network. The system includes means for associating individual bearers, from a first plurality of bearers, with a first bit rate limit and a Maximum Bit Rate, MBR. A load level is set by the system for the first plurality of bearers in the communication network. The actual load in the communication network is determined, the actual load depending on the first plurality of bearers.

The system determines whether the actual load is below the set load level; and if so the system polices the individual bearers from the first plurality of bearers based on the associated Maximum Bit Rate, MBR, for the individual bearers. If the actual load is not below the set load level the individual bearers are policed based on the first limit for the bit rate associated with the individual bearers.

In yet another aspect, the present invention is directed to a node for rate policing a bearer in a communication network. Individual bearers in a first plurality of bearers are associated with a first bit rate limit and a Maximum Bit Rate. The node sets a load level for the first plurality of bearers in the communication network. Depending on the first plurality of bearers, the node determines an actual load level in the network and if the actual load is below the set load level, the node uses means for policing the individual bearers, from the first plurality of bearers, based on the associated MBR for the individual bearers.

If the actual load is below the set load level, the node polices the individual bearers based on the first limit for the bit rate associated with the individual bearers. The node polices the individual bearers by dropping packets, buffering and delaying the packets or a combination of both actions.

The node, method and system can be adapted to any embodiment of the invention as described throughout this text.

BRIEF DESCRIPTION OF THE DRAWINGS

In the following, the features of the invention will be described in detail by showing preferred embodiments, with reference to the attached figures in which.

DETAILED DESCRIPTION OF THE INVENTION

In general, the present invention relates to a system, node and method of policing bit rates on bearers in a communication network dependent upon the load on the network. According to the invention, individual bearers from a first plurality of bearers are associated with a first bit rate limit and a maximum bit rate, i.e. corresponding values are defined for the individual bearers in the plurality. Typically, the first bit rate limit is lower than the maximum bit rate. All bearers in the plurality may have the same first bit rate limit and maximum bit rate but it is also possible that individual bearers in the plurality differ in one or both of their first bit rate limit and maximum bit rates. In some embodiments described below, the first bit rate limit is a guaranteed bit rate. Furthermore, a load level is set for the first plurality of bearers in the communication network.

An actual load is determined in the communication network, the actual load depending on the first plurality of bearers. The load may for example be determined for particular resources in the network, e.g. for a device, or for a section of the network, e.g. a cell or the area serviced by a node. The load is wholly or in part caused by the first plurality of bearers, e.g. further bearers may also contribute to the actual load.

It is determined if the actual load is below the set load level. In this case the policing the individual bearers from said first plurality of bearers is based on the associated MBR for the individual bearers. Else policing of the individual bearers is based on the first limit for the bit rate associated with the individual bearers. Policing of the bit rate may include dropping of packets, buffering and delaying the packets or a combination of both, dependent for example upon delay requirements or lack of buffering capabilities. Policing may also include a packet marking so that the marked packets can be dropped in case of any congestion.

Figure 1:
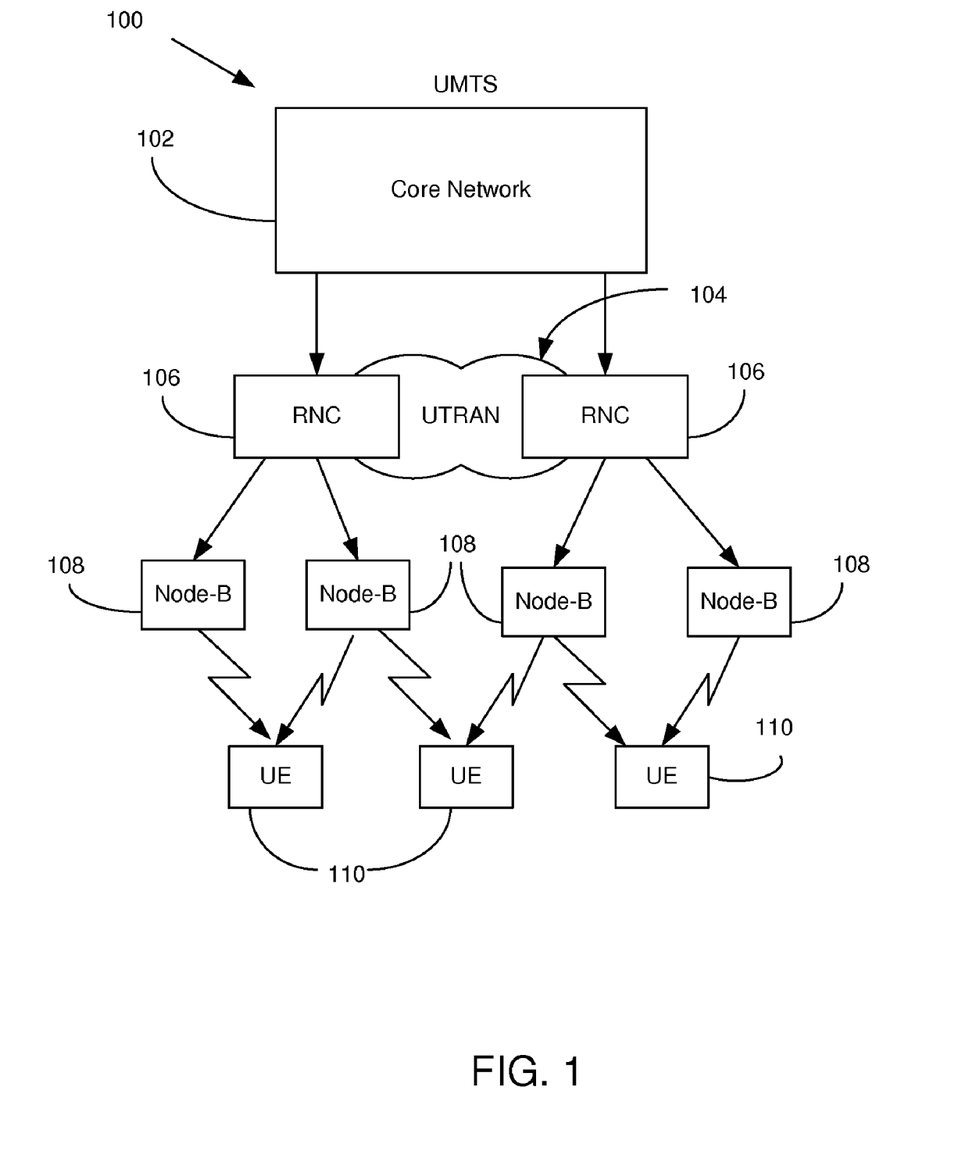
FIG. 1 illustrates a simplified block diagram of a UMTS network in the preferred embodiment of the present invention.

FIG. 1 illustrates a simplified block diagram of a UMTS network 100 that comprises a 3G network referred to as a core network 102 and a UMTS Terrestrial Radio Access Network (UTRAN) 104. The UTRAN comprises a plurality of Radio Network Controllers (RNCs) 106. There are various RNCs performing various roles and each RNC is connected to a set of base stations. A base station is often called a Node-B. Each Node-B 108 is responsible for communication with a User Equipment (UE) 110 within a given geographical cell. The serving RNC is responsible for routing user and signaling data between a Node-B and the core network. Although a UMTS network is shown, it should be understood that the present invention may be implemented in any type of network. In a preferred embodiment, the present invention may be used in an evolved UMTS system as exemplified in 3GPP Technical Report TR 23.882 V1.3.0 of the 3rd Generation Partnership Project.

For a GBR bearer, where both the GBR and the MBR attributes are present in the QoS profile, it is possible to use both GBR and MBR when conducting rate policing of the bearer. In the present invention, rate policing of the bearer utilizes GBR or MBR depending on the present load condition upon the network, generally the load on a particular section of the network, e.g. a cell, or on a particular device in the network, e.g. an RNC or Node B. The load in the network may be the processing load, load of radio resources (e.g., power or codes), or the load of other resources (e.g., devices, links, etc.). The load is determined for a plurality of bearers which corresponds generally to the resource or resources for which the load is determined. For example, a load on radio resources is typically determined for the bearers in a cell. If the load is the load on a device, e.g. a processing load, it can be determined for the bearers handled in the device or by a particular processor in the device.

Figure 2:
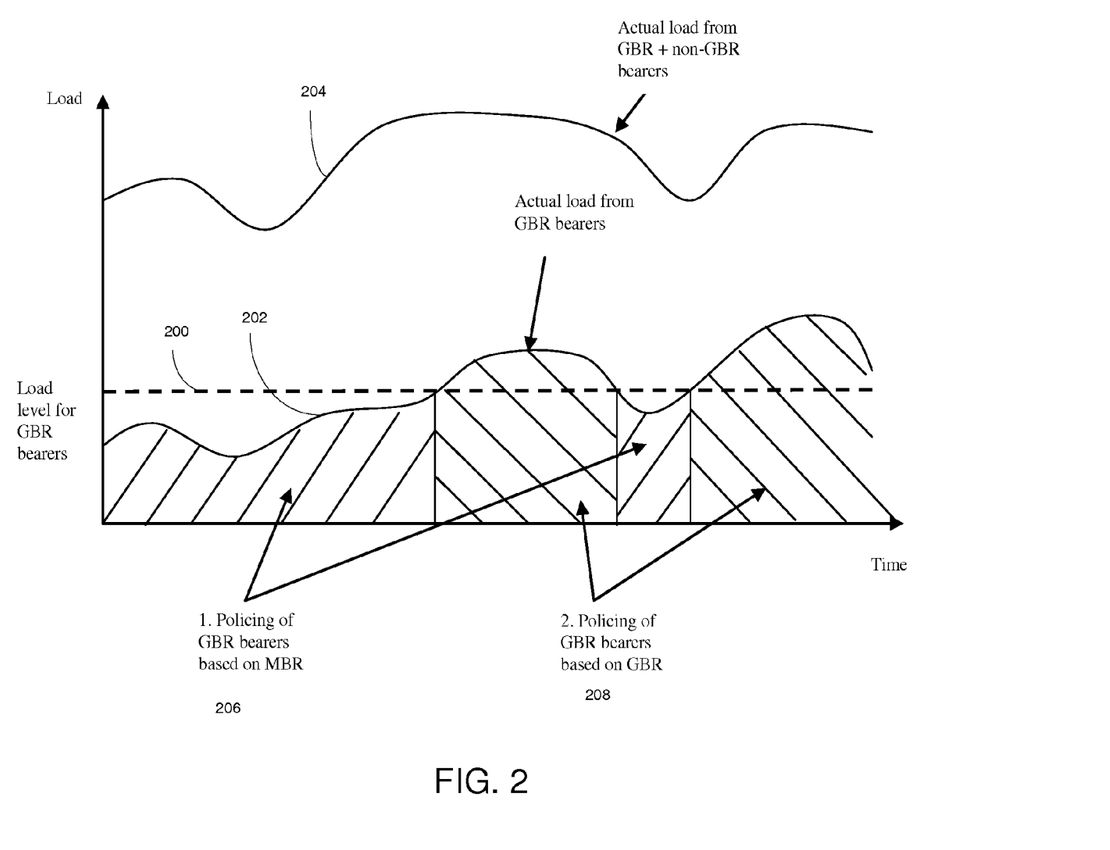
FIG. 2 is a graphical representation of load on the network versus time utilized in a preferred embodiment of the present invention.

FIG. 2 is a graphical representation of load on the network 100 versus time utilized in a preferred embodiment of the present invention. A load level 200 for a plurality of GBR bearers provides a specific load level on the network for determining which attribute to use. The actual load 202 from the plurality of GBR bearers is also shown. In addition, an actual load 204 from GBR and non-GBR bearers is also depicted. For each type of resource, a limit of a load level for the plurality of GBR bearers may be set. When the actual load 202 is lower than the specified load level 200, the GBR bearers are allowed to exceed their individual GBR bit rate, but not exceed their individual MBR bit rate i.e., rate policing is done on MBR for each GBR bearer as depicted in regions 206. However, when the load 202 reaches or exceeds the specified limit of the load level 200, the GBR bearers are no longer allowed to exceed their guaranteed bit rate i.e., rate policing is done according to the GBR for each GBR bearer as depicted in regions 208.

Load measurements may be based upon the processing load, load of radio resources e.g., power or codes, loads of other resources for load measurement or may be based on all or any combination of these or other load parameters. Several limits of load levels may also be defined, one for each type or group of resource, for which policing may be done on either the GBR or the MBR.

Figure 3:
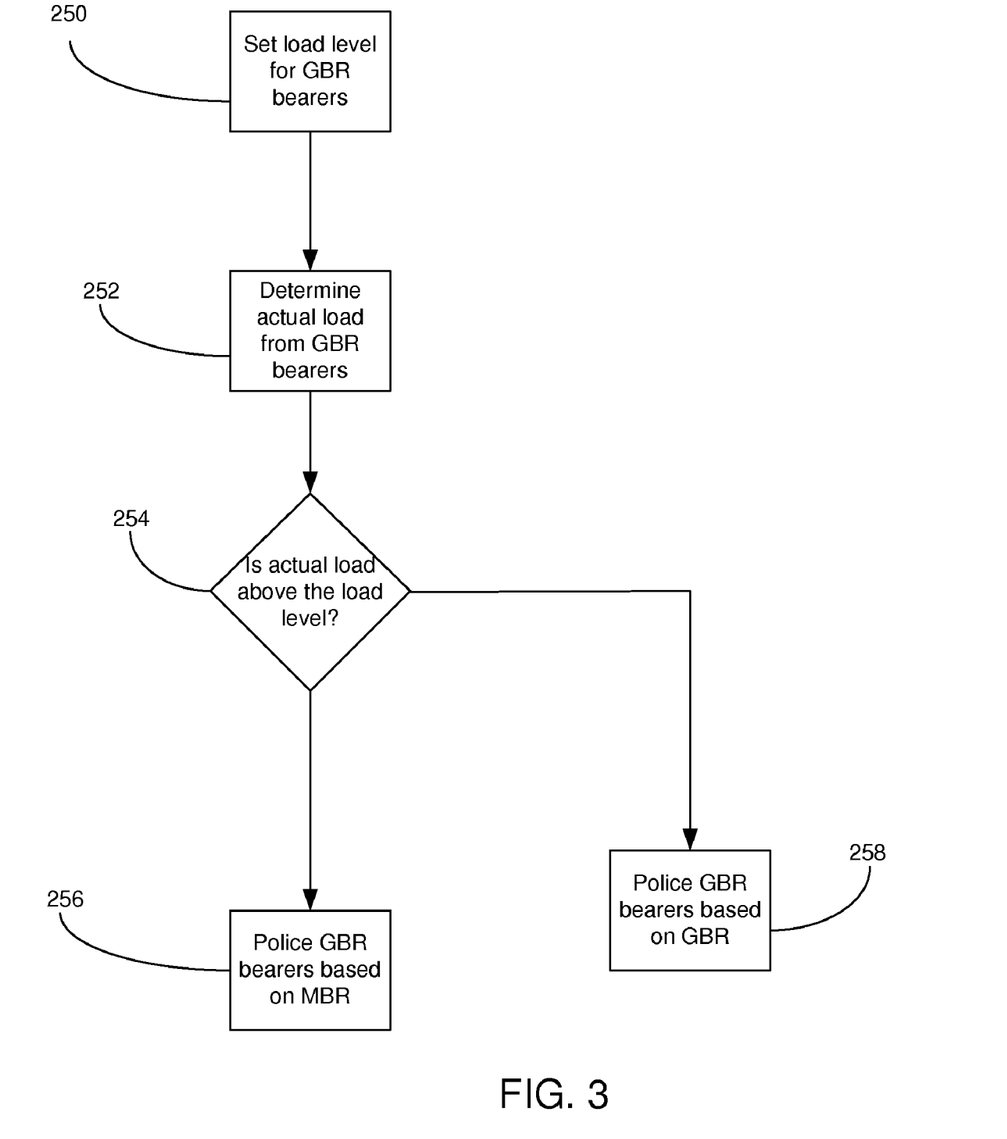
FIG. 3 is a flow chart illustrating the steps of policing bit rates dependent upon network load in an embodiment of the present invention.

FIG. 3 is a flow chart illustrating the steps of policing bit rates dependent upon network load in an embodiment of the present invention. With reference to FIGS. 1-3, the steps of the method will now be explained. The process begins with step 250 where the accumulated load level 200 for the plurality of GBR bearers is set. Next, in step 252, the actual load 202 from the plurality of GBR bearers on the network 100 is determined. The process then moves to step 254 where it is determined if the actual load 202 is at or above the load level 200. If the actual load is below the load level 200, the process moves to step 256 where the bit rates of the individual GBR bearers are policed based on the MBR. However, if it is determined in step 254 that the actual load is at or above the load level 200, the process moves to step 258 where policing of GBR bearers is based on the GBR.

To avoid repeated switching between the different policing regimes, some hysteresis is utilized. For example, the load may not be measured instantaneously in a similar fashion as other functions, such as admission control. Rather, the load or the point of switching is preferably measured over a period of time.

Figure 4:
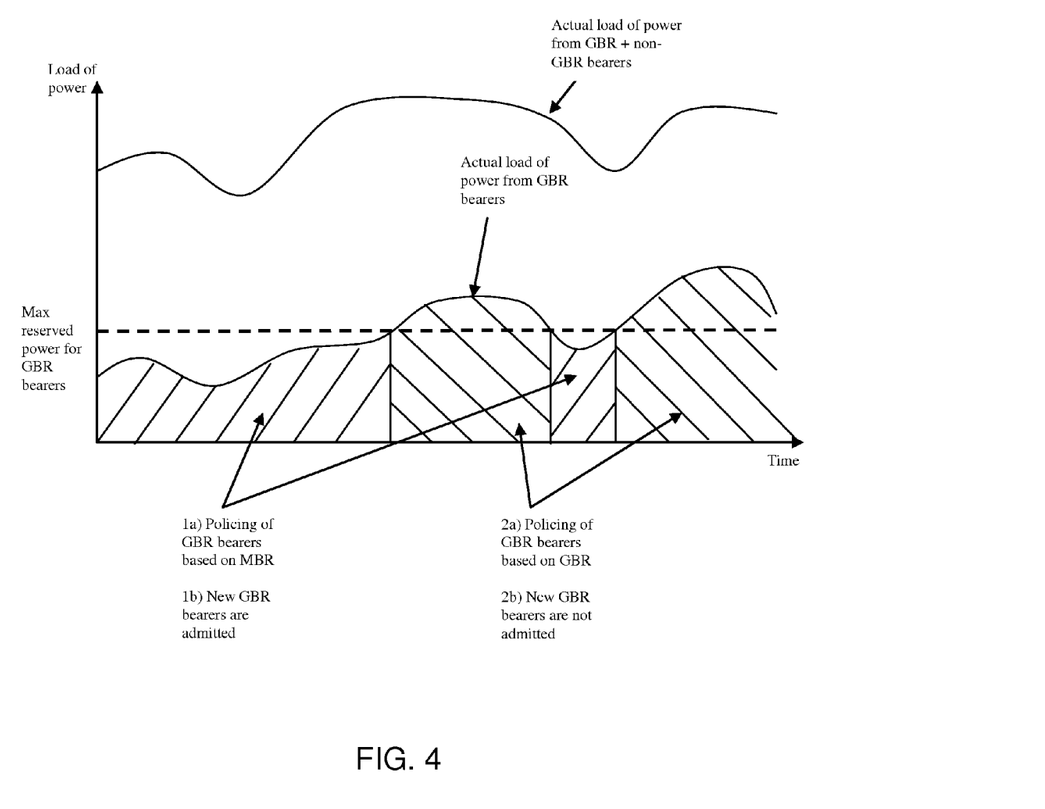
FIG. 4 is a graphical representation of load on the network versus time for use in an embodiment of the present invention.

FIG. 4 is a graphical representation of load on the network 100 versus time for use in an embodiment in which a maximum reserved power limit 300 is set for Guaranteed Bit Rate (GBR) bearers. An actual load 302 from the GBR bearers is also shown. In addition, an actual load of power 304 from GBR and non-GBR bearers is also depicted.

Preferably, the limits of load level 300 are equal to the reserved resources for that resource type. For example, in the network 100, it is possible to set the maximum level of reserved power 300 for GBR bearers. When the actual utilization of power 302 reaches the reserved power, the GBR bearers are policed on the GBR, instead of the Maximum Bit Rate (MBR), as depicted in regions 306. During this regime, new GBR bearers are not admitted. Thus, the admission of new GBR bearers is limited by the same limit, i.e., the maximum level of reserved power. If the actual load of power from the GBR bearers is less than the maximum reserved power for GBR bearers, policing of GBR is based on the MBR depicted in region 308. In this region, new GBR bearers are admitted.

With respect to bearers without an associated GBR, i.e. non-GBR bearers, GBR bearers have generally a higher priority than non-GBR bearers. Also, GBR bearers are guaranteed to receive at least Guaranteed Bit Rate but may receive a rate up to Maximum Bit Rate. Non-GBR bearers may receive a data rate between 0 and MBR. When load is increasing, non-GBR bearers are preferably downgraded in rate due to lower priority. With a load based policing regime for GBR bearers, it can be avoided that the GBR bearers are favored up to their MBR at the expense of non-GBR bearers by switching from a MBR policing to a GBR policing for the GBR bearers. For example, the total amount of resources may be divided into two (i.e., the maximum capacity that all the GBR bearers can take and the capacity for all other bearers). When the total GBR load is too high, i.e., more than the maximum all GBR bearers can take, all GBR bearers are policed according to the GBR, such that there will be resources left for the non-GBR bearers.

Figure 5:
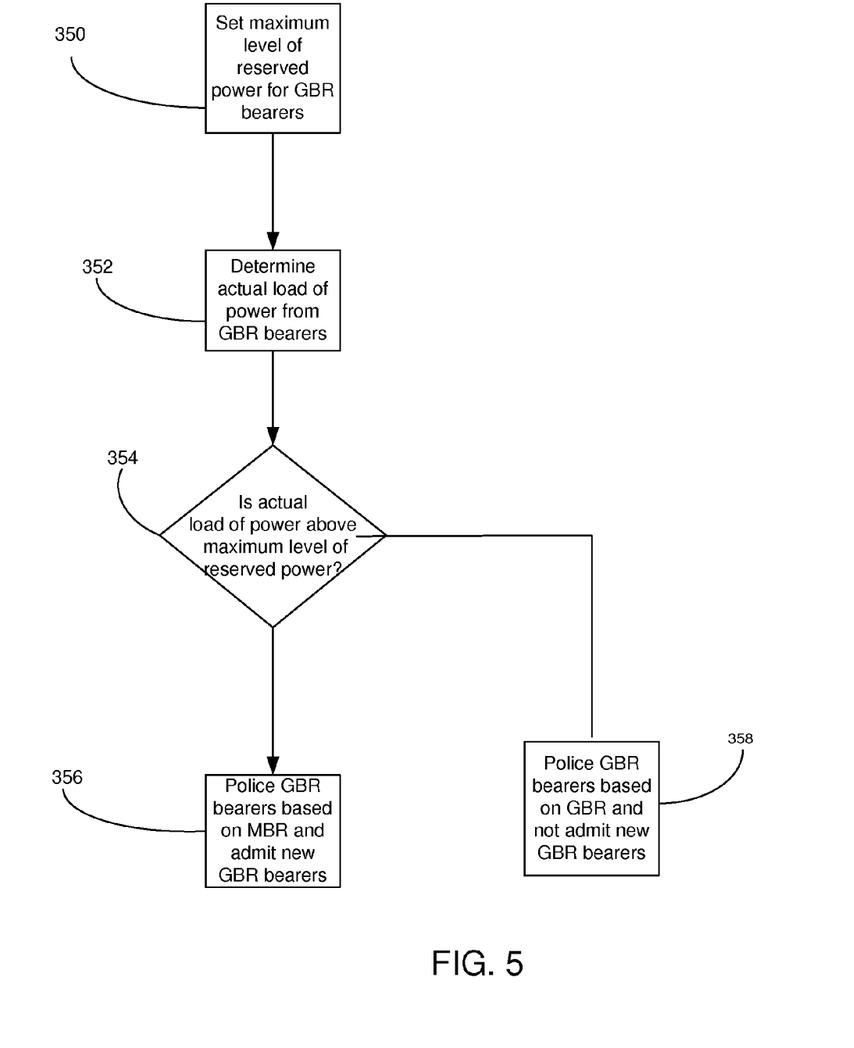
FIG. 5 is a flow chart illustrating the steps of policing and admission of new bearers in an embodiment of the present invention.

FIG. 5 is a flow chart illustrating the steps of policing and admission control of new bearers in an embodiment of the present invention. With reference to FIGS. 1, 4, and 5, the steps of the method will now be explained. The process begins with step 350 where the maximum level of reserved power 300 for GBR bearers is set. Next, in step 352, the actual load of power 302 from GBR bearers is determined. The process then moves to step 354 where it is determined whether the actual load of power 302 is at or above the maximum level of reserved power 300. If the actual load is below the maximum level of reserved power 300, the process moves to step 356 where the bit rates are policed on GBR bearers based on the MBR. In addition, new GBR bearers are admitted. However, in step 354, if it is determined that the actual load of power is at or above the maximum level of reserved power 300, the process moves to step 358 where policing GBR bearers is based on the GBR. In addition, new GBR bearers are not admitted.

In addition to performing rate policing of GBR bearers, a corresponding method according to the present invention may be utilized for non-GBR bearers. Limits of load levels different than the GBR limits may then be set for non-GBR bearers where policing may take effect. When the present load of non-GBR bearers is lower than the allowed limit of load level, the non-GBR bearers are policed according to their respective MBR. When the present load of non-GBR bearers is higher than the allowed limit of load level, the non-GBR bearers are policed according to a lower rate than the MBR. The policing rate may then be determined in different ways. In one embodiment, a fictive GBR=0 is utilized for these non-GBR bearers. This leads to a bit rate of zero for the period of time when the present load for non-GBR bearers is above the allowed limit of load level. Another embodiment for policing rates may be to decrease the policing rate from the MBR and then step down to zero, when necessary.

The present invention may also be applied if the GBR bearers and non-GBR bearers are divided into further types of bearers. For example, the bearers may be divided into different bearer types depending on other QoS attributes than the GBR and the MBR, (e.g., priority or transmission delays). For each bearer type, separate limits of load levels may be set. For each bearer type, policing is done on either the GBR or the MBR for the GBR bearers and on the MBR or a lower rate than MBR depending on the present load per each respective bearer type. The total amount of a specific resource may then be divided between all of these bearer types. By using several limits of load levels for different types of bearers, a slower downgrade of the total load of the resources is achieved.

The present invention may be utilized in any node in a UMTS or GSM network where load may occur due to traffic on the bearers. In a radio access network (RAN), the present invention may be especially useful since the RAN resources are typically very limited. The present invention may be implemented in an RNC 106, or a Node-B 108. The present invention is equally applicable for both the uplink (UL) and downlink (DL) transmissions in general. In an embodiment of the present invention, the present invention may be implemented in the UE 110. Preferably, the UE does not send more than the MBR in the UL. If one or more of the resources in the UE or the granted resources on the Uu interface between the UE and the access node of the mobile network are limited, the UE may be applied as discussed above.

Such a node, including a user equipment, generally comprises an input and output unit for sending and receiving data packets on the bearers or control signaling associated with the bearers. A unit in a processing system of the node is adapted to associate bearers with a first bit rate limit and an MBR. The node comprises a memory to store the associations. A load level administrating unit is used to store a load level for a first plurality of bearers in the communication net-work in a memory of the node.

The node comprises furthermore a measurement unit for determining an actual load in the communication network, wherein the actual load depends on the first plurality of bearers. The measurement unit may perform measurements within the node or obtain information from other devices in the communication system via the input and output unit. A comparator may be used to determine if the actual load is below the stored load level. A rate policer is adapted to police the individual bearers from the first plurality of bearers based on the associated MBR for the individual bearers if the actual load is below the stored load level. Otherwise, the rate policer polices the individual bearers based on the first limit for the bit rate associated with the individual bearers. A controller in the node can adapt the setting of the rate policer according to the output from the comparator. The above units may for example be implemented as software units in a processing system of the node or UE.

The present invention provides many advantages over existing policing procedures. With the present invention, a more optimal utilization of resources in the network is provided. In addition, the performance for the end-user services that run on GBR bearers is improved due to allowing bit rates at up to MBR when loads are low. In addition, there is less risk for starvation of non-GBR bearers when loads of GBR bearers increase. The present invention may be used in any mobile telecommunication system.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates all modifications that fall within the scope of the invention defined by the following claims.

What is claimed:

1. A method of rate policing of bearers in a communication network, the method comprising the steps of:
    associating individual bearers from a first plurality of bearers with a first bit rate limit and a maximum bit rate (MBR);
    setting a load level for the first plurality of bearers in the communication network;
    determining an actual load in the communication network, wherein the actual load depends on the first plurality of bearers;
    determining if the actual load is below the set load level; and
    if the actual load is below the set load level, policing the individual bearers from said first plurality of bearers based on the associated MBR for the individual bearers, else policing the individual bearers based on the first limit for the bit rate associated with the individual bearers.

2. The method of claim 1, wherein the first limit for the bit rate is a guaranteed bit rate (GBR) and the individual bearers from the first plurality of bearers are GBR bearers.

3. The method of claim 1, wherein the actual load depends on the first plurality of bearers and on a second plurality of bearers, the method comprising the further steps of
    associating second individual bearers from the second plurality of bearers with a second limit for the bit rate and a second MBR,
    setting a second load level for the second plurality of bearers in the communication network;
    determining if the actual load is below the second load level; and
    if the actual load is below the second load level, policing the second individual bearers from said second plurality based on the associated second MBR for the second individual bearers, else policing the second individual bearers based on the second limit for the bit rate associated with the second individual bearers.

4. The method of claim 3, wherein the second limit for the bit rate is zero.

5. The method of claim 1, wherein individual bearers from the first plurality of bearers differ in at least one of their associated first bit rate limit and their associated MBR.

6. The method of claim 1, wherein the policing comprises dropping packets; or
    buffering and delaying the packets.

7. The method of claim 1, wherein the step of determining the actual load comprises determining at least one of a load on specified radio resources in the network or a processing load.

8. The method of claim 7, wherein the set load level is a maximum level of reserved power for the first plurality of bearers and the actual load is an actual load of power from the first plurality of bearers.

9. The method of claim 1, the network being a Universal Mobile Telecommunication System (UMTS) network or a Global System for Mobile Communications (GSM) network.

10. The method of claim 1, wherein the step of determining if the actual load is below the set load level includes providing a hysteresis.

11. The method of claim 1, wherein the method further includes the step of admitting a further bearer to said first plurality of bearers if the actual load is below the set load level and not admitting a further bearer to said first plurality if the actual load is at or above the set load level.

12. A system for rate policing of a bearer in a communication network, the system comprising:
    means for associating individual bearers, from a first plurality of bearers, with a first bit rate limit and a Maximum Bit Rate (MBR);
    means for setting a load level for the first plurality of bearers in the communication network;
    processor means for determining an actual load in the communication network, wherein the actual load depends on the first plurality of bearers;
    means for determining if the actual load is below the set load level; and
    means for policing the individual bearers from said first plurality of bearers based on the associated MBR for the individual bearers if the actual load is below the set load level, and else for policing the individual bearers based on the first limit for the bit rate associated with the individual bearers.

13. The system of claim 12, wherein the first limit for the bit rate is a guaranteed bit rate, GBR, and wherein the individual bearers from the first plurality of GBR bearers are GBR bearers.

14. The system of claim 12, wherein the actual load depends on the first plurality of bearers and on a second plurality of bearers, the system further comprising:
    means for associating second individual bearers from the second plurality of bearers with a second limit for the bit rate and a second MBR,
    means for setting a second load level for the second plurality of bearers in the communication network;
    means for determining if the actual load is below the second load level; and
    if the actual load is below the second load level, means in the system for policing the second individual bearers from said second plurality based on the associated second MBR for the second individual bearers, else policing the second individual bearers based on the second limit for the bit rate associated with the second individual bearers.

15. The system of claim 14, wherein the second limit for the bit rate is zero.

16. The system of claim 12, wherein the individual bearers from the first plurality of bearers differ in at least one of their associated first bit rate limit and their associated MBR.

17. The system of claim 12, wherein the policing comprises dropping packets or buffering and delaying the packets.

18. The system of claim 12, wherein the means for determining the actual load further comprises means for determining at least one of a load on specified radio resources in the network and a processing load.

19. The system of claim 18, wherein the set load level is a maximum level of reserved power for the first plurality of bearers and the actual load is an actual load of power from the first plurality of bearers.

20. The system of claim 12, the network being a Universal Mobile Telecommunication System (UMTS) network or a Global System for Mobile Communications (GSM) network.

21. The system of claim 12, wherein the means for determining if the actual load is below the set load level includes means for providing a hysteresis.

22. The system of claim 12, the system further including means for admitting a further bearer to said first plurality of bearers if the actual load is below the set load level and not admitting a further bearer to said first plurality if the actual load is at or above the set load level.

23. A node for rate policing of a bearer in a network, the node comprising:
   means for associating individual bearers, from a first plurality of bearers, with a first bit rate limit and a Maximum Bit Rate (MBR);
   means for setting a load level for the first plurality of bearers in the communication network;
   means for determining an actual load in the communication network, wherein the actual load depends on the first plurality of bearers;
   means for determining if the actual load is below the set load level; and
   means for policing the individual bearers from said first plurality of bearers based on the associated MBR for the individual bearers if the actual load is below the set load level, and else for policing the individual bearers based on the first limit for the bit rate associated with the individual bearers.

24. The node of claim 23, wherein the node is a radio network controller in the network or a node-B in the network or a user equipment.

\* \* \* \* \*